United States Patent
Sekii (10) Patent No.: US 11,725,713 B2
(45) Date of Patent: Aug. 15, 2023

(54) PLANETARY GEAR MECHANISM AND GEARED MOTOR

(71) Applicant: Nidec Corporation, Kyoto (JP)

(72) Inventor: Yoichi Sekii, Kyoto (JP)

(73) Assignee: NIDEC CORPORATION, Kyoto (JP)

( * ) Notice: Subject to any disclaimer, the term of this patent is extended or adjusted under 35 U.S.C. 154(b) by 0 days.

(21) Appl. No.: 17/542,797

(22) Filed: Dec. 6, 2021

(65) Prior Publication Data
US 2022/0178423 A1    Jun. 9, 2022

(30) Foreign Application Priority Data

Dec. 8, 2020    (JP) .................................. 2020-203173

(51) Int. Cl.
*F16H 1/46*    (2006.01)
*F16H 57/08*    (2006.01)
*F16H 1/28*    (2006.01)

(52) U.S. Cl.
CPC ............. *F16H 1/46* (2013.01); *F16H 57/082* (2013.01); *F16H 2001/2872* (2013.01); *F16H 2001/2881* (2013.01)

(58) Field of Classification Search
CPC ..... F16H 2001/289; F16H 1/46; F16H 57/082
See application file for complete search history.

(56) References Cited

U.S. PATENT DOCUMENTS 10,876,596 B1 *  12/2020  Bonny ................... F16D 65/186
2010/0120574 A1    5/2010  Maekawa
2014/0356027 A1 *  12/2014  Yamazaki ............... F16D 1/101
                                                      399/167

FOREIGN PATENT DOCUMENTS

JP    2014-173708 A    9/2014

* cited by examiner

*Primary Examiner* — Derek D Knight
(74) *Attorney, Agent, or Firm* — Keating & Bennett (57) ABSTRACT

A planetary gear mechanism includes a sun gear attached to the motor rotation shaft to rotate about the central axis extending vertically, a fixed internal gear radially outside the sun gear, planetary gears radially outside the sun gear and radially inside the fixed internal gear to mesh with the sun gear and the fixed internal gear, a movable internal gear above the fixed internal gear and radially outside the planetary gears to mesh with the planetary gears and to rotate about the central axis, and a carrier that holds upper and lower surfaces of the planetary gears.

20 Claims, 6 Drawing Sheets

PLANETARY GEAR MECHANISM AND GEARED MOTOR

CROSS-REFERENCE TO RELATED APPLICATIONS

The present application claims priority under 35 U.S.C. § 119 to Japanese Patent Application No. 2020-203173, filed on Dec. 8, 2020, the entire contents of which are hereby incorporated herein by reference.

1. Field of the Invention

The present disclosure relates to a planetary gear mechanism, a geared motor, and a racing module.

2. Background

Conventionally, a planetary gear mechanism is widely used to decelerate a rotating shaft. For example, the planetary gear mechanism includes a sun gear, a plurality of planetary gears meshing with the sun gear, a carrier supporting the plurality of planetary gears arranged around the sun gear as a center, and an output shaft fixed to the carrier.

However, in the conventional technique, only one end side in the rotation axis direction of the planetary gear is supported by the carrier, and is easily affected by an external force, and it is difficult to stabilize the arrangement of the planetary gear.

SUMMARY

An example embodiment of a planetary gear mechanism of the present disclosure includes a sun gear, a fixed internal gear, planetary gears, a movable internal gear, and a carrier. The planetary gear mechanism decelerates and outputs rotation input from a motor rotation shaft that rotates about a central axis extending in a vertical direction to an outside. The sun gear is attached to the motor rotation shaft and rotates about the central axis. The fixed internal gear is located radially outside the sun gear. The planetary gears are located radially outside the sun gear and radially inside the fixed internal gear, and mesh with the sun gear and the fixed internal gear. The movable internal gear is located above the fixed internal gear and radially outside the planetary gears, meshes with the planetary gears, and rotates about the central axis. The carrier holds upper and lower surfaces of the planetary gears.

An example embodiment of a geared motor of the present disclosure includes the planetary gear mechanism described above.

An example embodiment of a racing module of the present disclosure includes the geared motor described above.

The above and other elements, features, steps, characteristics and advantages of the present disclosure will become more apparent from the following detailed description of the example embodiments with reference to the attached drawings.

DETAILED DESCRIPTION

Example embodiments of the present disclosure will be described below with reference to the drawings. Note that the scope of the present disclosure is not limited to the example embodiments described below, but includes any modification thereof within the scope of the technical idea of the present disclosure.

In the specification, a direction of a planetary gear mechanism in which a central axis of a sun gear extends is simply referred to as "axial direction", a direction perpendicular to the central axis of the sun gear as the center is simply referred to as "radial direction", and a direction extending along a circular arc centered on the central axis of the sun gear is simply referred to as "circumferential direction".

Figure 1:
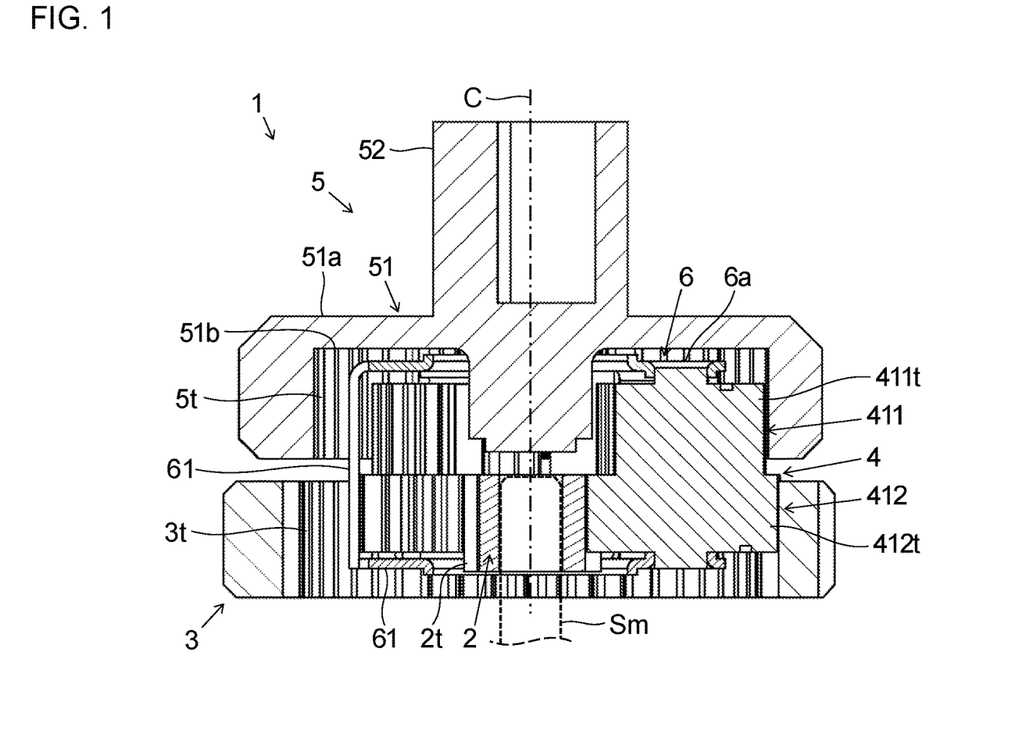
FIG. 1 is a longitudinal sectional view of a planetary gear mechanism according to an example embodiment of the present disclosure.
Figure 11:
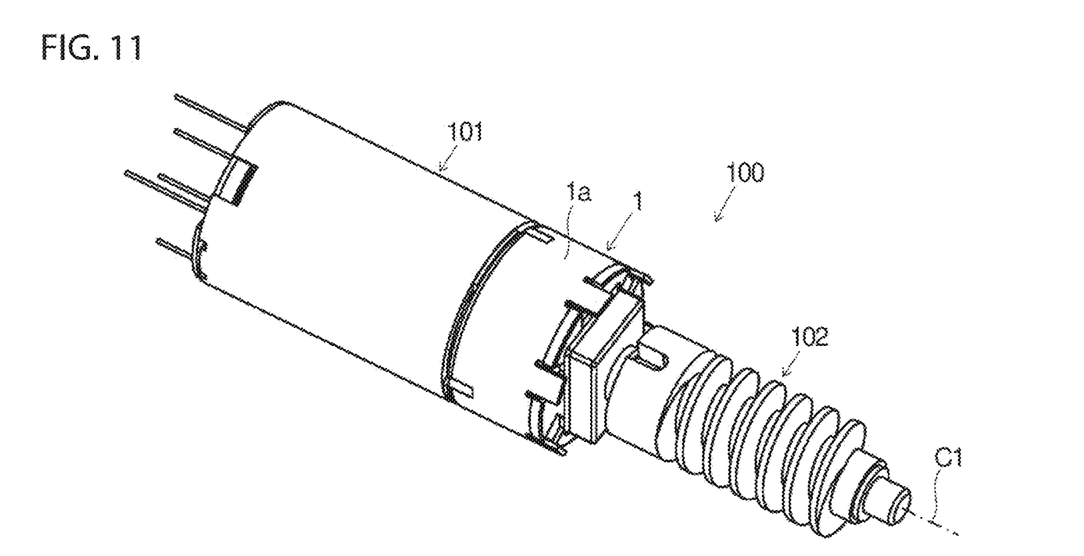
FIG. 11 is a perspective view of a geared motor according to an example embodiment of the present disclosure.
Figure 12:
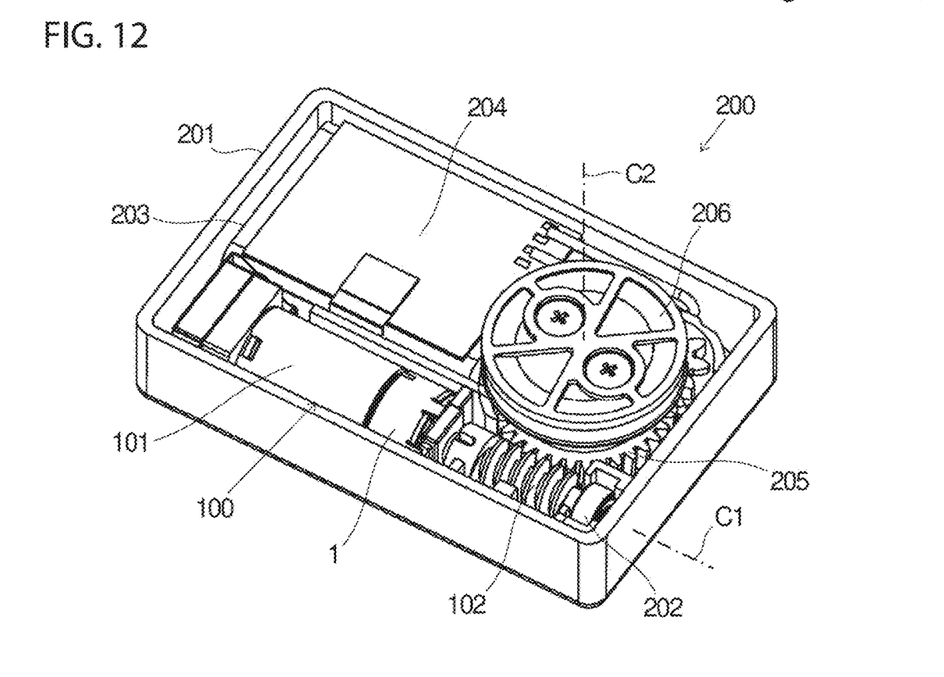
FIG. 12 is a perspective view of a racing module according to an example embodiment of the present disclosure.

Additionally, for the sake of convenience in description, in the specification, the axial direction is assumed as "vertical direction", and the shape of parts and positional relationships among the parts are described on the assumption that the vertical direction in FIG. 1 is the vertical direction of the planetary gear mechanism. Note that the above definition of the vertical direction does not restrict the orientations and positional relations of the planetary gear mechanism when in use. For example, as illustrated in FIGS. 11 and 12, when the planetary gear mechanism is combined with another device such as a geared motor or a racing module, the axial direction of the planetary gear mechanism may extend in the horizontal direction.

Further, in the specification, a section parallel to the axial direction (vertical direction) is referred to as a "longitudinal section". Note that the terms "parallel" and "perpendicular" used in the present specification include not only those "exactly parallel" and "exactly perpendicular", respectively, but also those "substantially parallel" and "substantially perpendicular", respectively.

Figure 2:
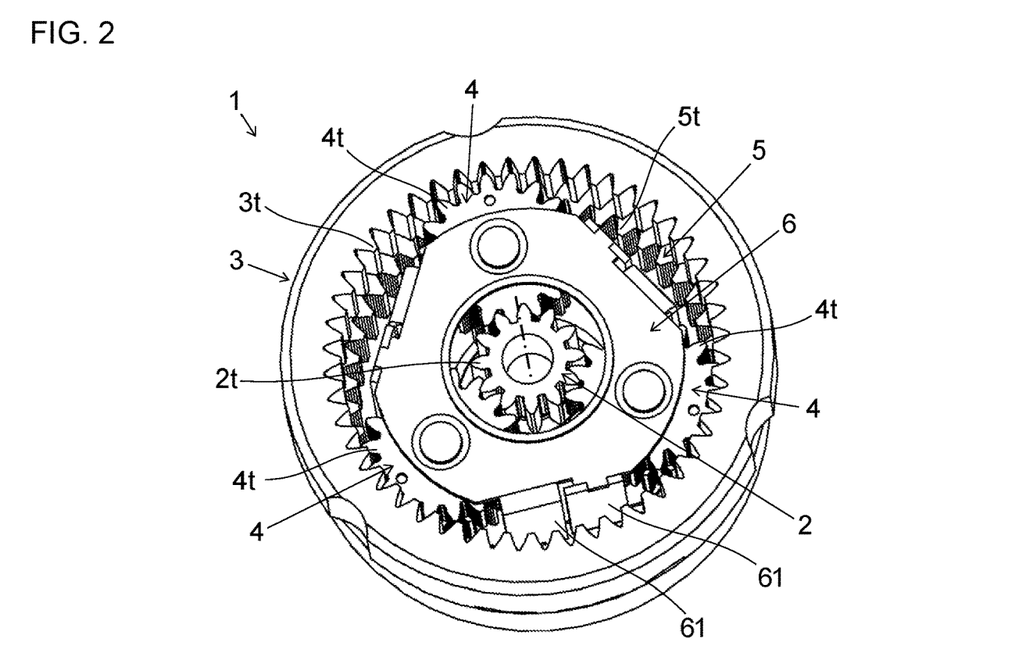
FIG. 2 is a perspective view of the planetary gear mechanism of FIG. 1.

FIG. 1 is a longitudinal sectional view of a planetary gear mechanism 1 according to an example embodiment of the present disclosure. FIG. 2 is a perspective view of the planetary gear mechanism 1 of FIG. 1. The planetary gear mechanism 1 decelerates the rotation input from a motor rotation shaft Sm rotating about a central axis C extending in the vertical direction and outputs the rotation to the outside. The planetary gear mechanism 1 includes a sun gear 2, a fixed internal gear 3, a plurality of planetary gears 4, a movable internal gear 5, and a carrier 6.

The sun gear 2 is located at the lower part of the planetary gear mechanism 1 and at the radial center of the planetary gear mechanism 1. The rotation axis of the sun gear 2 is arranged along the central axis C. The sun gear 2 has a cylindrical shape extending along the central axis C, and a plurality of teeth 2t are juxtaposed on the outer peripheral portion. The sun gear 2 is attached to the motor rotation shaft Sm and rotates about the central axis C.

The fixed internal gear 3 is located radially outside the sun gear 2. The fixed internal gear 3 has a cylindrical shape extending along the central axis C, and a plurality of teeth 3t are juxtaposed on the inner peripheral portion. The inner diameter of the fixed internal gear 3 is larger than the outer diameter of the sun gear 2. The fixed internal gear 3 is fixed to a case (not illustrated) or the like disposed on the outer peripheral portion.

The plurality of planetary gears 4 are located radially outside the sun gear 2 and radially inside the fixed internal gear 3. In the present example embodiment, the planetary gear mechanism 1 includes three planetary gears 4. The three planetary gears 4 are arranged at equal angles of 120 degrees in the circumferential direction around the central axis C, and are held by the carrier 6.

In the present example embodiment, the planetary gear 4 includes an upper gear 411 and a lower gear 412. The upper gear 411 is located above the planetary gear 4. The lower gear 412 is located below the upper gear 411. The upper gear 411 and the lower gear 412 are coupled in the vertical direction and integrally configured. Both the upper gear 411 and the lower gear 412 extend in the vertical direction parallel to the central axis C, and a plurality of teeth 411t and 412t are juxtaposed on the outer peripheral portion. The upper gear 411 and the lower gear 412 have different outer diameters and different numbers of teeth. The planetary gear 4 may be configured as one gear without being divided into the upper gear 411 and the lower gear 412.

The plurality of planetary gears 4 mesh with the sun gear 2 and the fixed internal gear 3. In detail, the lower gears 412 of the three planetary gears 4 mesh with the sun gear 2 and the fixed internal gear 3. The upper gears 411 of the three planetary gears 4 mesh with the movable internal gear 5.

The movable internal gear 5 is located above the fixed internal gear 3 and radially outside the plurality of planetary gears 4. The movable internal gear 5 has a cylindrical shape extending along the central axis C, and a plurality of teeth 5t are juxtaposed on the inner peripheral portion. The movable internal gear 5 meshes with the plurality of planetary gears 4 and rotates about the central axis C. The movable internal gear 5 includes a ceiling 51 and an output shaft 52. The ceiling 51 closes the upper end of the cylinder in which the plurality of teeth 5t are juxtaposed on the inner peripheral portion. The output shaft 52 is disposed on an upper surface 51a of the ceiling 51 and extends upward along the central axis C.

The carrier 6 includes two carrier holders 61. The two carrier holders 61 individually face the upper surface and the lower surface of each of the three planetary gears 4. The two carrier holders 61 hold the three planetary gears 4 between themselves in the vertical direction. That is, the carrier 6 holds the upper and lower surfaces of the plurality of planetary gears 4.

By holding the upper and lower surfaces of the three planetary gears 4 by the carrier 6, the assembled state of the three planetary gears 4 can be strengthened. As a result, it is possible to stabilize the arrangement of the planetary gears 4 without being affected by an external force.

Figure 3:
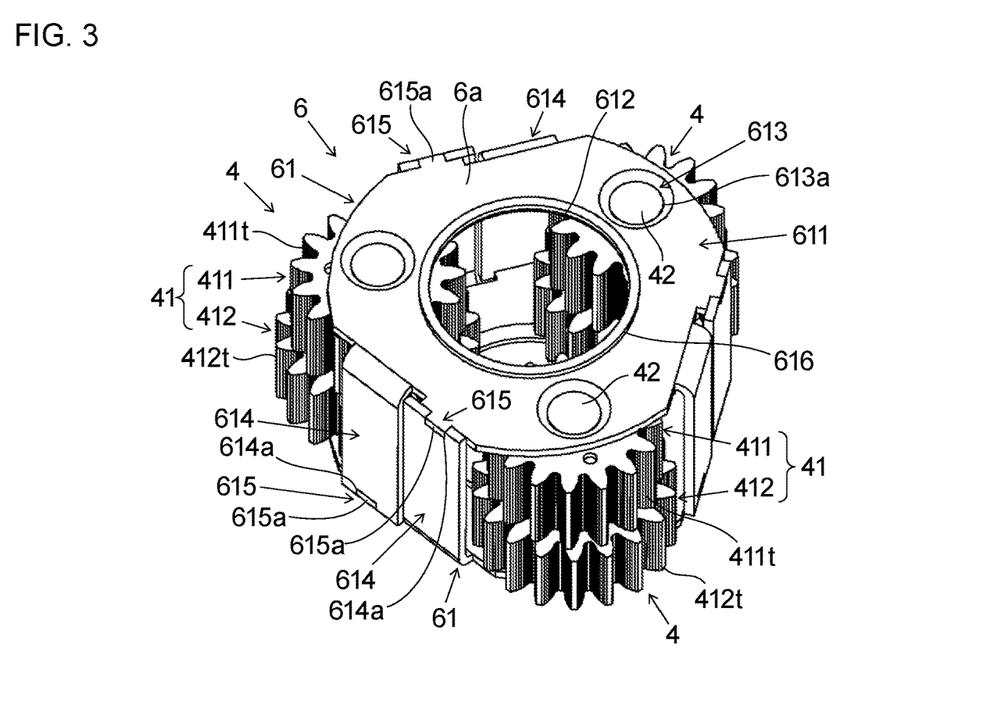
FIG. 3 is a perspective view of a carrier and a planetary gear of the planetary gear mechanism of a first example embodiment of the present disclosure.
Figure 4:
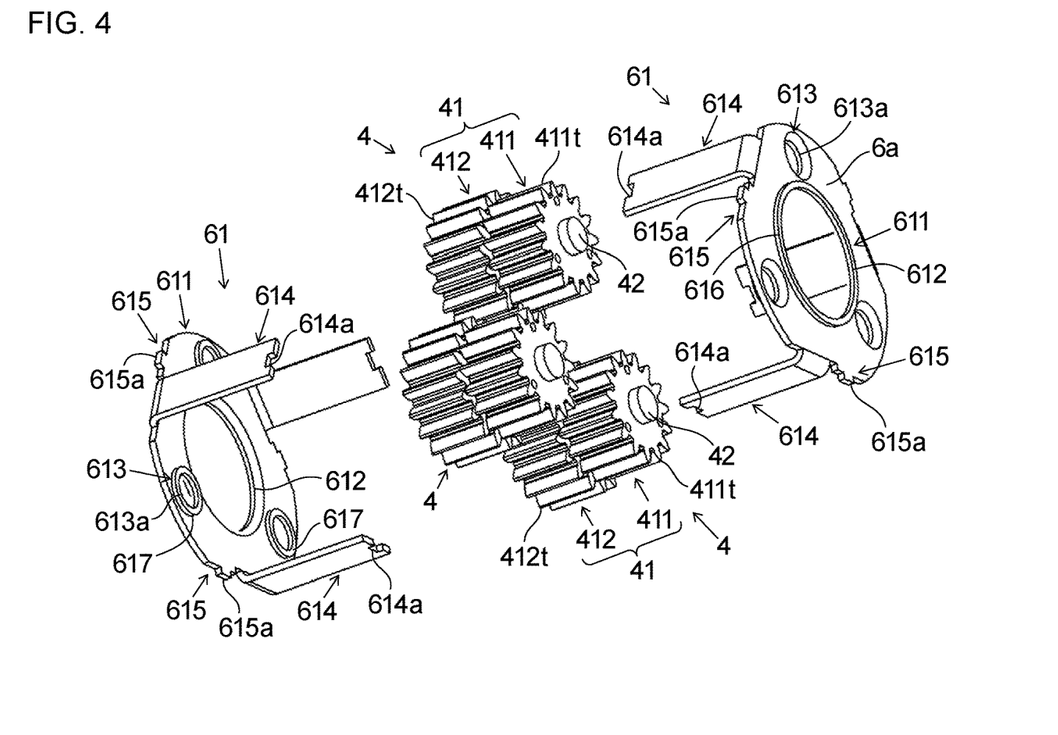
FIG. 4 is an exploded perspective view of the carrier and the planetary gear in FIG. 3.
Figure 5:
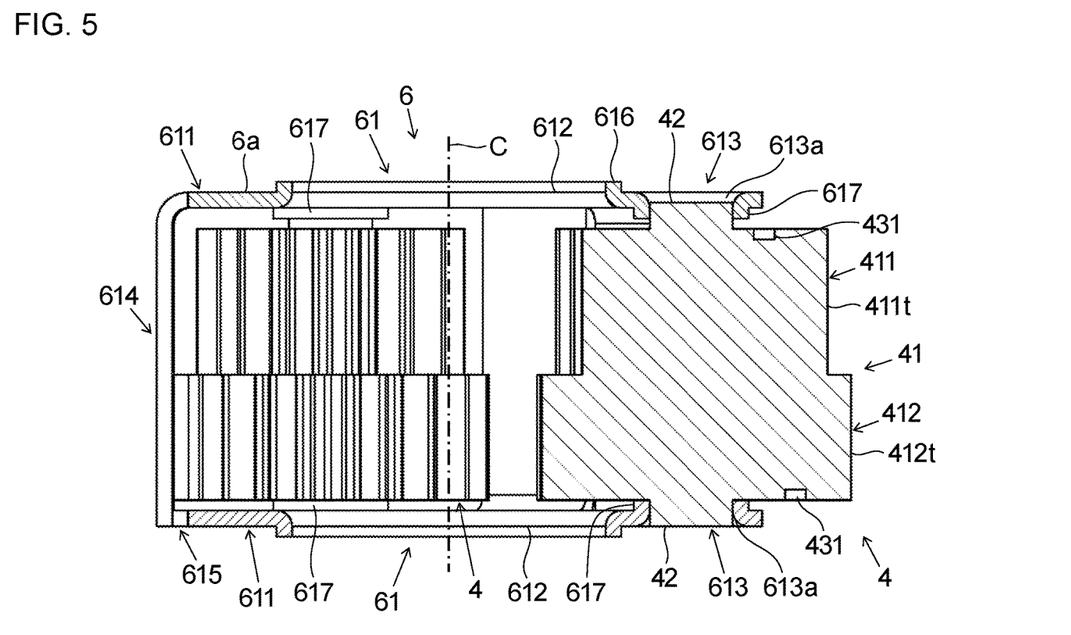
FIG. 5 is a longitudinal sectional view of the carrier and the planetary gear in FIG. 3.
Figure 6:
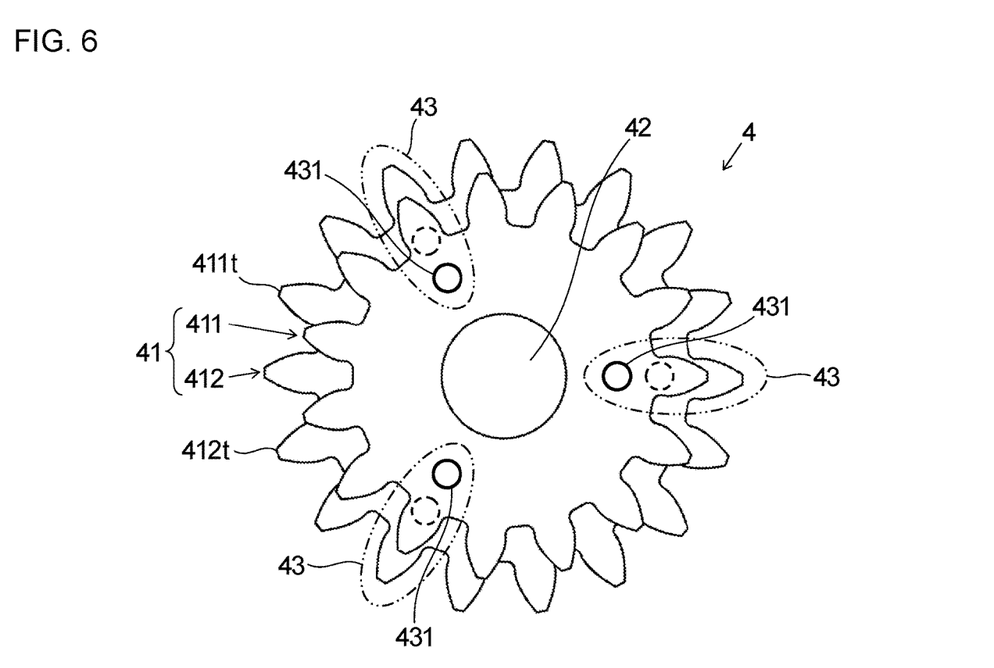
FIG. 6 is a top view of the planetary gear in FIG. 3.

FIG. 3 is a perspective view of the carrier 6 and the planetary gear 4 of the planetary gear mechanism 1 according to the first example embodiment of the present disclosure. FIG. 4 is an exploded perspective view of the carrier 6 and the planetary gear 4 of FIG. 3. FIG. 5 is a longitudinal sectional view of the carrier 6 and the planetary gear 4 of FIG. 3. FIG. 6 is a top view of the planetary gear 4 of FIG. 3.

The carrier 6 includes two carrier holders 61 having the same shape. The two carrier holders 61 having the same shape individually hold the upper surfaces of the plurality of planetary gears 4 and the lower surfaces of the plurality of planetary gears 4, and face each other in the vertical direction. The carrier holder 61 is formed of, for example, a sheet metal. The carrier holder 61 includes a flat plate portion 611, a central hole 612, a plurality of gear support portions 613, a connection piece 614, and a connection receiving portion 615.

The flat plate portion 611 faces the upper surfaces or the lower surfaces of the plurality of planetary gears 4. The flat plate portion 611 expands in the radial direction around the central axis C. The flat plate portion 611 is formed in a substantially circular shape or a substantially hexagonal shape when viewed from the vertical direction.

The central hole 612 is located at the radial center of the flat plate portion 611. The central hole 612 vertically penetrates the flat plate portion 611. The central hole 612 is formed in a circular shape when viewed from the vertical direction.

The plurality of gear support portions 613 are located radially outside the central hole 612 on the flat plate portion 611. The same number of gear support portions 613 as the planetary gears 4 are provided. That is, in the present example embodiment, the carrier holder 61 includes three gear support portions 613. The three gear support portions 613 are arranged at equal angles of 120 degrees in the circumferential direction. The three gear support portions 613 face the respective three planetary gears 4 in the vertical direction. The gear support portion 613 has a support hole 613a penetrating in the vertical direction. The plurality of gear support portions 613 individually support the plurality of planetary gears 4.

The connection piece 614 is located at the radially outer edge of the flat plate portion 611. The connection piece 614 is located between the plurality of gear support portions 613 in the circumferential direction of the flat plate portion 611. In other words, the connection piece 614 is disposed between the three planetary gears 4 in the circumferential direction. That is, in the present example embodiment, each carrier holder 61 has three connection pieces 614. The connection piece 614 is formed in an elongated flat plate shape. The connection piece 614 extends in the vertical direction toward the other opposing carrier holder 61. The connection piece 614 has a recess 614a recessed in the vertical direction at the distal end portion.

The connection receiving portion 615 is located at the radially outer edge of the flat plate portion 611. The connection receiving portion 615 is adjacent to the connection piece 614 in the circumferential direction. The connection receiving portion 615 is located between the plurality of gear support portions 613 in the circumferential direction of the flat plate portion 611. In other words, the connection receiving portion 615 is disposed between the three planetary gears 4 in the circumferential direction. That is, in the present example embodiment, each carrier holder 61 has three connection receiving portions 615. The connection receiving portion 615 has a protruding portion 615a protruding radially outward. The connection piece 614 of the other carrier holder 61 facing in the vertical direction is connected to the connection receiving portion 615. Specifically, the protruding portion 615a of the connection receiving portion 615 is inserted into and connected to the recess 614a of the connection piece 614.

According to the above configuration, in the carrier 6, the plurality of planetary gears 4 can be held by the carrier holder 61 which is one type of component. As a result, the number of types of components used in the planetary gear mechanism 1 can be reduced.

A protruding portion may be formed on the connection piece 614, and a recess may be formed on the connection receiving portion 615. Both the recess 614a and the protruding portion 615a have, for example, a rectangular shape when viewed from the vertical direction, but may have another shape such as a substantially circular shape. Further, the connection piece 614 and the connection receiving portion 615 may be disposed radially inside the radially outer edge portion of the flat plate portion 611.

The carrier 6 has an upper protruding portion 616. The upper protruding portion 616 is disposed on an upper surface 6a of the carrier 6. Specifically, the upper protruding portion 616 is disposed on the upper surface of the flat plate portion 611 of the upper carrier holder 61. The upper protruding portion 616 is disposed at the peripheral edge of the central hole 612 and is formed in an annular shape. The upper protruding portion 616 is formed by, for example, burring on a sheet metal member.

The ceiling 51 of the movable internal gear 5 is located above the carrier 6. That is, the upper surface 6a of the carrier faces the ceiling 51 of the movable internal gear 5 in the vertical direction. The upper protruding portion 616 faces a part of a lower surface 51b of the ceiling 51 of the movable internal gear 5 in the vertical direction, and protrudes upward toward the lower surface 51b of the ceiling 51.

According to the above configuration, the contact area between the carrier 6 and the movable internal gear 5 can be reduced. As a result, sliding friction between the carrier 6 and the movable internal gear 5 can be reduced, each of the carrier 6 and the movable internal gear 5 can be smoothly rotated, and wear and generation of frictional heat can be suppressed.

The carrier 6 has an inner protruding portion 617. The inner protruding portion 617 is disposed on the lower surface of the flat plate portion 611 of the upper carrier holder 61 and the upper surface of the flat plate portion 611 of the lower carrier holder 61. The inner protruding portion 617 is arranged at the peripheral edge portion of the support hole 613a of each of the three gear support portions 613 and is formed in an annular shape. The inner protruding portion 617 is formed by, for example, burring on a sheet metal member.

The inner protruding portion 617 on the upper side of the carrier 6 faces the upper surfaces of the plurality of planetary gears 4 in the vertical direction and protrudes downward toward the upper surfaces of the plurality of planetary gears 4. The inner protruding portion 617 on the lower side of the carrier 6 faces the lower surfaces of the plurality of planetary gears 4 in the vertical direction and protrudes upward toward the lower surfaces of the plurality of planetary gears 4. According to this configuration, the contact area between the carrier 6 and the planetary gear 4 can be reduced. As a result, sliding friction between the carrier 6 and the planetary gear 4 can be reduced, each of the carrier 6 and the planetary gear 4 can be smoothly rotated, and wear and generation of frictional heat can be suppressed.

The planetary gear 4 includes a gear portion 41 and a rotation shaft 42. The gear portion 41 extends in the vertical direction in parallel with the central axis C, and is divided into the upper gear 411 and the lower gear 412 in the vertical direction. The plurality of teeth 411t and 412t are juxtaposed on the outer peripheral portion of the gear portion 41. The rotation shaft 42 is disposed along the central axis of the gear portion 41. The rotation shaft 42 protrudes in the vertical direction from the upper surface and the lower surface of the gear portion 41. The rotation shaft 42 is inserted into the support hole 613a of the gear support portion 613 of the carrier holder 61. By integrally forming the gear portion 41 and the rotation shaft 42, it is possible to improve positional accuracy of the rotation shaft 42 with respect to the gear portion 41.

As illustrated in FIG. 6, the planetary gear 4 includes an in-phase portion 43 and an index portion 431.

The in-phase portion 43 is a portion where the position of one tooth 411t of the upper gear 411 and the position of one tooth 412t of the lower gear 412 coincide in the circumferential direction. In the present example embodiment, the planetary gear 4 has three in-phase portions 43. The three in-phase portions 43 are arranged at equal angles of 120 degrees in the circumferential direction around the rotation shaft 42 of the planetary gear 4.

The index portion 431 is disposed on the upper surface and the lower surface of the in-phase portion 43. The index portion 431 is a mark indicating that the position of the index portion 431 is the in-phase portion 43, and is formed as a recess in the present example embodiment. The index portion 431 may be a protruding portion, an engraved mark, or the like.

According to this configuration, positioning of the planetary gear 4 with respect to the fixed internal gear 3 and the movable internal gear 5 is facilitated. Therefore, workability of assembly of the planetary gear mechanism 1 can be improved.

The gear portion 41 and the rotation shaft 42 are made of metal or metal alloy. According to this configuration, it is possible to achieve high rigidity and long life of the planetary gear 4.

The outer surface of the planetary gear 4 is subjected to fluorine coating processing. According to this configuration, it is possible to improve wear resistance and low friction of the planetary gear 4.

Further, the sun gear 2, the fixed internal gear 3, the planetary gear 4, the movable internal gear 5, and the carrier 6 are coated with a lubricant in their respective contact areas. According to this configuration, it is possible to improve wear resistance and low friction of each gear.

Figure 7:
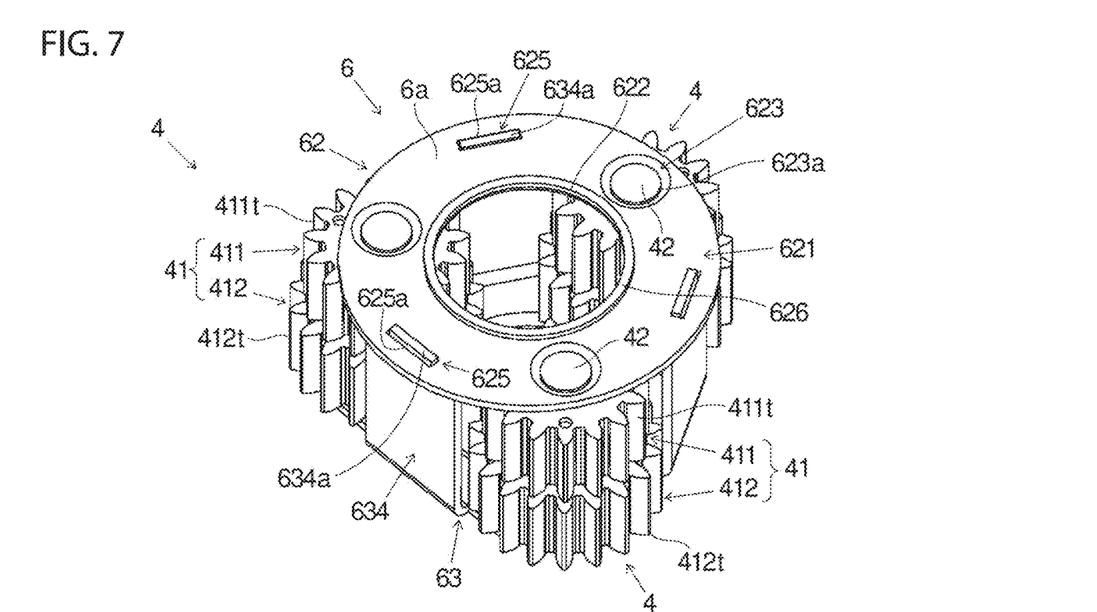
FIG. 7 is a perspective view of a carrier and a planetary gear of a planetary gear mechanism according to a second example embodiment of the present disclosure.
Figure 8:
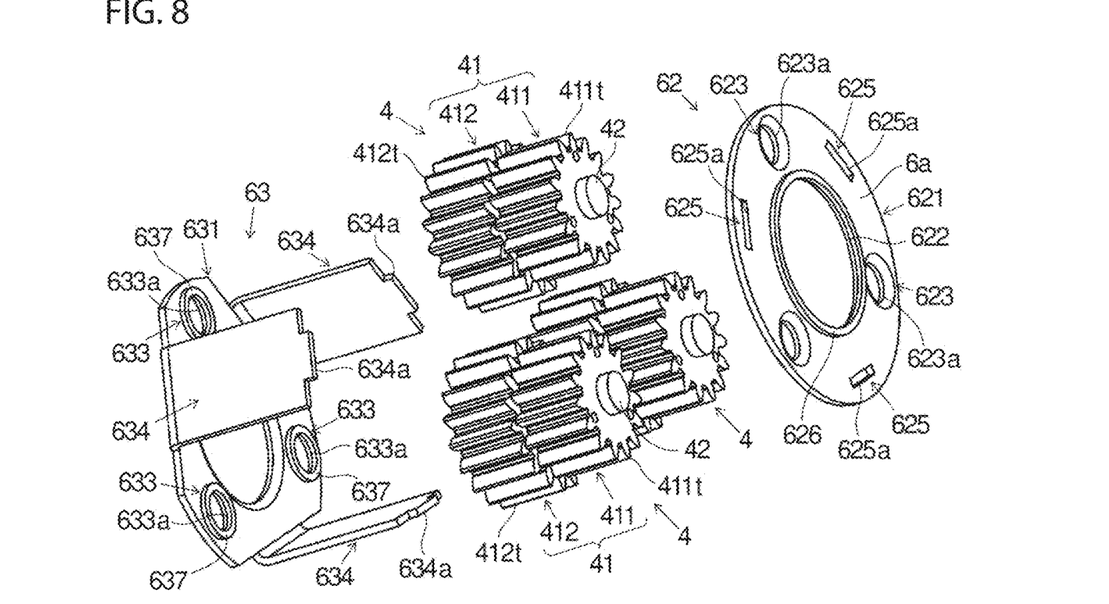
FIG. 8 is an exploded perspective view of the carrier and the planetary gear in FIG. 7.
Figure 9:
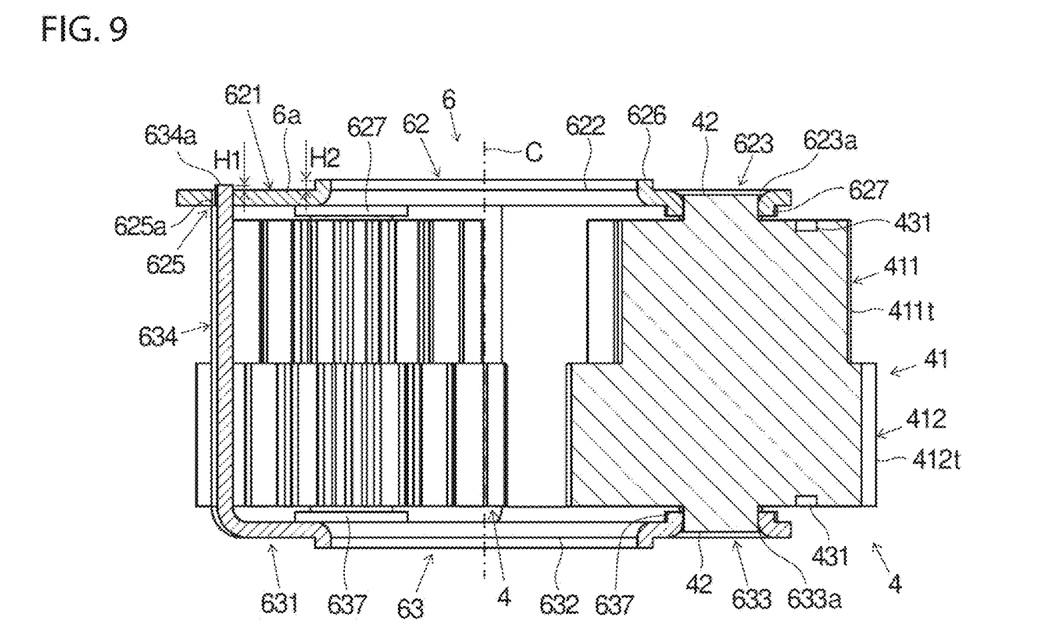
FIG. 9 is a longitudinal sectional view of the carrier and the planetary gear in FIG. 7.

FIG. 7 is a perspective view of the carrier 6 and the planetary gear 4 of the planetary gear mechanism 1 according to a second example embodiment of the present disclosure. FIG. 8 is an exploded perspective view of the carrier 6 and the planetary gear of FIG. 7. FIG. 9 is a longitudinal sectional view of the carrier 6 and the planetary gear 4 of FIG. 7.

The carrier 6 includes a carrier lid 62 and a carrier base 63. The carrier lid 62 holds one of the upper and lower surfaces of the plurality of planetary gears 4. The carrier base 63 vertically faces the carrier lid 62 and holds the other of the upper and lower surfaces of the plurality of planetary gears 4. In the present example embodiment, the carrier lid 62 holds the upper surfaces of the plurality of planetary gears 4. In the present example embodiment, the carrier base 63 holds the lower surfaces of the plurality of planetary gears 4. The carrier lid 62 and the carrier base 63 are formed of, for example, a sheet metal.

The carrier lid 62 includes a lid flat plate portion 621, a lid central hole 622, a plurality of lid gear support portions 623, and a connection receiving portion 625.

The lid flat plate portion 621 faces the upper surfaces of the plurality of planetary gears 4. The lid flat plate portion 621 extends in the radial direction about the central axis C. The lid flat plate portion 621 is formed in a circular shape when viewed from the vertical direction.

The lid central hole 622 is located at the radial center of the lid flat plate portion 621. The lid central hole 622 vertically penetrates the lid flat plate portion 621. The lid central hole 622 is formed in a circular shape when viewed from the vertical direction.

The plurality of lid gear support portions 623 are located on the radially outer side of the lid central hole 622 on the lid flat plate portion 621. The lid gear support portions 623 are provided as many as the planetary gears 4. That is, in the present example embodiment, the carrier lid 62 has three lid gear support portions 623. The three lid gear support portions 623 are arranged at an equal angle of 120 degrees in the circumferential direction. The three lid gear support portions 623 face the three planetary gears 4 in the vertical direction. The lid gear support portion 623 has a support hole 623a penetrating in the vertical direction. The three lid gear support portions 623 individually support the three planetary gears 4.

The connection receiving portion 625 is located radially outside the lid central hole 622 of the lid flat plate portion 621. The connection receiving portion 625 is located between the plurality of lid gear support portions 623 in the circumferential direction of the lid flat plate portion 621. In other words, the connection receiving portion 625 is disposed between the three planetary gears 4 in the circumferential direction. That is, in the present example embodiment, the carrier lid 62 has three connection receiving portions 625. The connection receiving portion 625 has a hole portion 625a penetrating the lid flat plate portion 621 in the vertical direction. The carrier base 63 facing in the vertical direction is connected to the connection receiving portion 625.

The carrier base 63 includes a base flat plate portion 631, a base center hole 632, a plurality of base gear support portions 633, and a connection piece 634.

The base flat plate portion 631 faces the lower surfaces of the plurality of planetary gears 4. The base flat plate portion 631 extends in the radial direction about the central axis C.

The base center hole 632 is located at the radial center of the base flat plate portion 631. The base center hole 632 vertically penetrates the base flat plate portion 631. The base center hole 632 is formed in a circular shape when viewed from the vertical direction.

The plurality of base gear support portions 633 are located radially outside the base center hole 632 on the base flat plate portion 631. The same number of base gear support portions 633 as the planetary gears 4 are provided. That is, in the present example embodiment, the carrier base 63 includes three base gear support portions 633. The three base gear support portions 633 are arranged at an equal angle of 120 degrees in the circumferential direction. The three base gear support portions 633 face the respective three planetary gears 4 in the vertical direction. The base gear support portions 633 has a support hole 633a penetrating in the vertical direction. The three base gear support portions 633 individually support the three planetary gears 4.

The connection piece 634 is located at the radially outer edge of the base flat plate portion 631. The connection piece 634 is located between the plurality of base gear support portions 633 in the circumferential direction of the base flat plate portion 631. In other words, the connection piece 634 is disposed between each of the three planetary gears 4 in the circumferential direction. That is, in the present example embodiment, the carrier base 63 has three connection pieces 634. The connection piece 634 is formed in an elongated flat plate shape. The connection piece 634 extends in the vertical direction toward the carrier lid 62 facing in the vertical direction. The connection piece 634 has a protruding portion 634a protruding upward at the distal end portion. The connection piece 634 is connected to the connection receiving portion 625 of the carrier lid 62. Specifically, the protruding portion 634a of the connection piece 634 of the carrier base 63 is inserted into and connected to the hole portion 625a of the connection receiving portion 625 of the carrier lid 62.

According to the above configuration, it is possible to reduce the connection portion between the carrier lid 62 constituting the carrier 6 and the carrier base 63. This enables the carrier 6 to be increased in strength.

A protruding portion may be formed in the connection receiving portion 625, and a recess may be formed in the connection piece 634. Both the hole portion 625a and the protruding portion 634a have, for example, a rectangular shape when viewed from the vertical direction, but may have another shape such as a circular shape. Further, the connection receiving portion 625 may be formed on the radially outer edge portion of the lid flat plate portion 621, or the connection piece 634 may be disposed radially inside the radially outer edge portion of the base flat plate portion 631.

The carrier 6 has an upper protruding portion 626. The upper protruding portion 626 is disposed on the upper surface 6a of the carrier 6. Specifically, the upper protruding portion 626 is disposed on the upper surface of the lid flat plate portion 621 of the carrier lid 62. The upper protruding portion 626 is disposed at the peripheral edge of the lid central hole 622 and is formed in an annular shape. The upper protruding portion 626 is formed by, for example, burring on a sheet metal member.

As illustrated in FIG. 9, the upper end portion of the connection piece 634 of the carrier base 63 protrudes upward from the upper surface 6a of the carrier 6. Specifically, the upper end portion of the protruding portion 634a of the connection piece 634 of the carrier base 63 protrudes upward from the upper surface of the lid flat plate portion 621 of the carrier lid 62. A height H1 from the upper surface 6a of the carrier 6 to the upper end portion of the connection piece 634 is lower than a height H2 from the upper surface 6a of the carrier 6 to the upper end portion of the upper protruding portion 626.

According to the above configuration, it is possible to reduce the contact portion between the carrier 6 and the movable internal gear 5. As a result, the carrier 6 and the movable internal gear 5 can be smoothly rotated, and wear and generation of frictional heat can be suppressed.

In the first example embodiment, the upper end portion of the connection piece 614 extending upward from the lower carrier holder 61 may protrude upward from the upper surface of the flat plate portion 611 of the upper carrier holder 61. Similarly in this case, the height from the upper surface 6a of the carrier 6 to the upper end portion of the connection piece 614 is lower than the height from the upper surface 6a of the carrier 6 to the upper end portion of the upper protruding portion 616.

The carrier 6 has inner protruding portions 627 and 637. The inner protruding portion 627 is disposed on the lower surface of the flat plate portion 621 of the carrier lid 62. The inner protruding portion 627 is arranged at the peripheral edge portion of the support hole 623a of each of the three gear support portions 623 and is formed in an annular shape. The inner protruding portion 637 is disposed on the upper surface of the flat plate portion 631 of the carrier base 63. The inner protruding portion 637 is arranged at the peripheral edge portion of the support hole 633a of each of the three gear support portions 633 and is formed in an annular shape. The inner protruding portions 627 and 637 are formed by, for example, burring on a sheet metal member.

The inner protruding portion 627 faces the upper surfaces of the plurality of planetary gears 4 in the vertical direction and protrudes downward toward the upper surfaces of the plurality of planetary gears 4. The inner protruding portion 637 faces the lower surfaces of the plurality of planetary gears 4 in the vertical direction and protrudes upward toward the lower surfaces of the plurality of planetary gears 4. According to this configuration, the contact area between the carrier 6 and the planetary gear 4 can be reduced. As a result, sliding friction between the carrier 6 and the planetary gear 4 can be reduced, each of the carrier 6 and the planetary gear 4 can be smoothly rotated, and wear and generation of frictional heat can be suppressed.

Figure 10:
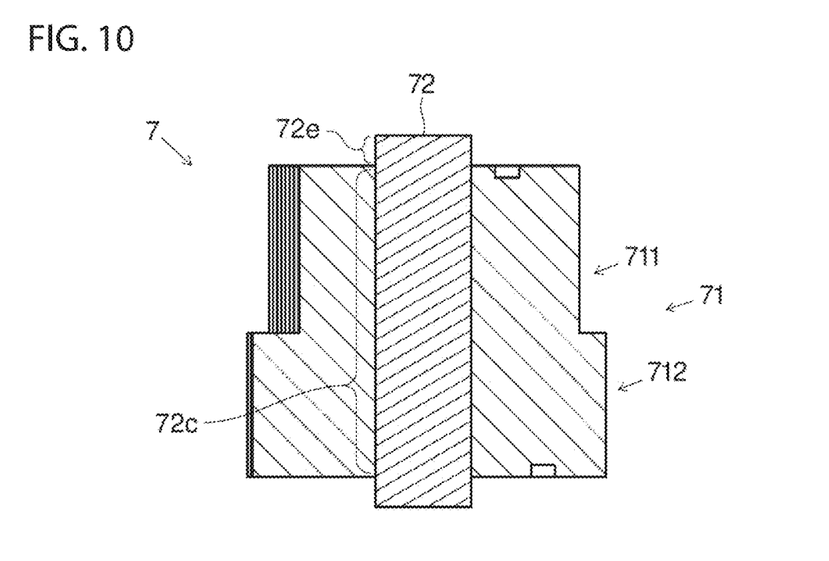
FIG. 10 is a longitudinal sectional view of a planetary gear according to a modification of an example embodiment of the present disclosure.

FIG. 10 is a longitudinal sectional view of a planetary gear 7 according to a modification. The planetary gear 7 of the modification includes a gear portion 71 and a rotation shaft 72. The gear portion 71 is divided into an upper gear 711 and a lower gear 712 in the vertical direction. The rotation shaft 72 penetrates from the upper surface side to the lower surface side of the gear portion 71. The gear portion 71 and the rotation shaft 72 are formed as different members and coupled. The gear portion and the rotation shaft 72 may be directly coupled by, for example, press-fitting or the like, or may be indirectly coupled by, for example, bonding or the like.

For example, the gear portion 71 and the rotation shaft 72 are made of different metals or metal alloys. According to this configuration, the materials of the gear portion 71 and the rotation shaft 72 can be changed according to the application of the planetary gear mechanism 1.

For example, the gear portion 71 is made of resin. The rotation shaft 72 is made of metal or metal alloy. According to this configuration, wear resistance and low friction property of the gear portion 71 can be improved.

The rotation shaft 72 is in contact with the gear portion 71 between the upper surface and the lower surface of the gear portion 71. The rotation shaft 72 protrudes from the gear portion 71 above the upper surface and below the lower surface of the gear portion 71 to expose the peripheral surface. The surface roughness of at least a part of a contact area 72c of the rotation shaft 72 with the gear portion 71 is larger than the surface roughness of an exposed area 72e of the rotation shaft 72 with respect to the gear portion 71. According to this configuration, the coupling strength between the gear portion 71 and the rotation shaft 72 can be increased.

FIG. 11 is a perspective view of a geared motor 100 according to an example embodiment of the present disclosure. The geared motor 100 includes the planetary gear mechanism 1 having the above configuration. The geared motor 100 includes a motor 101 and a worm 102. The planetary gear mechanism 1 includes a case 1a. The sun gear 2, the fixed internal gear 3, the plurality of planetary gears 4, the movable internal gear 5, and the carrier 6 illustrated in FIG. 1 are housed in the case 1a.

The sun gear 2 (see FIG. 1) of the planetary gear mechanism 1 is attached to a rotation shaft (not illustrated) of the motor 101 extending toward the planetary gear mechanism 1. The output shaft 52 (see FIG. 1) of the movable internal gear 5 of the planetary gear mechanism 1 extends toward the worm 102 and is connected to the worm 102. The planetary gear mechanism 1 decelerates the rotation input from the rotation shaft of the motor 101 rotating about the central axis C1 and outputs the rotation to the worm 102. The geared motor 100 rotates the worm 102 about the central axis C1.

According to the above configuration, in the geared motor 100, the arrangement of the planetary gears 4 can be stabilized. Therefore, the deceleration performance of the motor 101 can be improved.

FIG. 12 is a perspective view of a racing module 200 according to an example embodiment of the present disclosure. The racing module 200 includes geared motor 100 configured as described above. That is, the racing module 200 includes the planetary gear mechanism 1 having the above configuration. Further, the racing module 200 includes a case 201, a bearing 202, a battery 203, a control unit 204, a worm wheel 205, and a spool 206.

The case 201 accommodates the geared motor 100, the bearing 202, the battery 203, the control unit 204, and the worm wheel 205 therein. The geared motor 100 is supported by the case 201 and the bearing 202. The worm 102 is rotatably supported by the bearing 202.

The motor 101 is electrically connected to the battery 203 and the control unit 204. The motor 101 receives power supply from the battery 203 and rotates a rotation shaft (not illustrated). The motor 101 is controlled by the control unit 204. The geared motor 100 rotates the worm 102 about a central axis C1 by the motor 101.

The worm wheel 205 is connected to the worm 102. The worm wheel 205 rotates about a central axis C2 orthogonal to the central axis C1 of the worm 102. The spool 206 is coupled coaxially with the worm wheel 205. That is, the spool 206 is rotated about the central axis C2 together with the worm wheel 205 by the geared motor 100. The geared motor 100 rotates the spool 206 in both forward and reverse directions with respect to the central axis C2. A string material (not illustrated) is wound around the spool 206.

The racing module 200 can wind the string around the spool 206 or unwind the string from the spool 206 by rotating the spool 206 in both forward and reverse directions by the geared motor 100.

According to the above configuration, in the racing module 200, the arrangement of the planetary gears 4 can be stabilized, and the deceleration performance of the motor 101 can be improved. Therefore, it is possible to stabilize the operation of winding the string around the spool 206 or unwinding the string from the spool 206.

For example, the planetary gear mechanism 1 and the geared motor 100 are not limited to the racing module, and may be mounted on various household electrical appliances, transportation equipment, medical equipment, OA equipment, and the like.

The present disclosure can be used, for example, in an electric device having a motor to which a speed reduction mechanism including a racing module is connected.

Features of the above-described example embodiments and the modifications thereof may be combined appropriately as long as no conflict arises.

While example embodiments of the present disclosure have been described above, it is to be understood that variations and modifications will be apparent to those skilled in the art without departing from the scope and spirit of the present disclosure. The scope of the present disclosure, therefore, is to be determined solely by the following claims.

What is claimed is:

1. A planetary gear mechanism that decelerates rotation input from a motor rotation shaft that rotates about a central axis extending in a vertical direction and outputs the rotation to an outside, the planetary gear mechanism comprising:
    a sun gear attached to the motor rotation shaft and rotatable about the central axis;
    a fixed internal gear located radially outside the sun gear;
        planetary gears that are located radially outside the sun gear and radially inside the fixed internal gear to mesh with the sun gear and the fixed internal gear;
    a movable internal gear that is located above the fixed internal gear and radially outside the planetary gears to mesh with the planetary gears, and to rotate about the central axis; and
    a carrier that holds upper and lower surfaces of the planetary gears; wherein
    the carrier includes an inner protruding portion opposing a portion of upper and lower surfaces of the planetary gears in the vertical direction and protruding toward the upper and lower surfaces of the planetary gears.

2. The planetary gear mechanism according to claim 1, wherein
    the carrier individually holds upper surfaces of the planetary gears and lower surfaces of the planetary gears, and includes two carrier holders having a same shape and opposing each other in a vertical direction; and
    the carrier holder includes:
    a flat plate portion that extends in a radial direction while opposing an upper surface or a lower surface of the planetary gears;
    a central hole located at a radial center portion of the flat plate portion and penetrating the flat plate portion in a vertical direction;
    gear support portions that are located on a radially outer side of the central hole on the flat plate portion, are arranged at equal or substantially equal angles in a circumferential direction, and individually support the planetary gears;
    a connector located between the gear support portions in a circumferential direction of the flat plate portion and extending in a vertical direction; and
    a connector receiving portion which is located between the gear support portions in a circumferential direction of the flat plate portion and to which the connector of another carrier holder opposing each other in a vertical direction is connected.

3. The planetary gear mechanism according to claim 2, wherein
    the carrier includes an upper protruding portion on an upper surface of the carrier and extending upward;
    an upper end portion of the connector protrudes upward from an upper surface of the carrier; and
    a height from an upper surface of the carrier to an upper end of the connector is lower than a height from an upper surface of the carrier to an upper end of the upper protruding portion.

4. The planetary gear mechanism according to claim 1, wherein
    the carrier includes a carrier lid that holds one of upper and lower surfaces of the planetary gears, and a carrier base that vertically opposes the carrier lid and holds another one of the upper and lower surfaces of the planetary gears;
    the carrier lid includes:
    a lid flat plate portion that extends in a radial direction while opposing an upper surface or a lower surface of the planetary gears;
    a lid central hole located at a radial center portion of the lid flat plate portion and vertically penetrating the lid flat plate portion;
    lid gear support portions that are located on a radially outer side of the lid central hole on the lid flat plate portion, arranged at equal or substantially equal angles in a circumferential direction, and individually support the planetary gears; and
    a connector receiving portion which is located between the lid gear support portions in a circumferential direction of the lid flat plate portion and to which the carrier base is connected; and
    the carrier base includes:
    a base flat plate portion that extends in a radial direction while opposing an upper surface or a lower surface of the planetary gears;
    a base center hole located at a radial center of the base flat plat portion and penetrating the base flat portion in the vertical direction;
    base gear support portions located radially outside the base center hole on the base flat plate portion and arranged at equal or substantially equal angles in the circumferential direction to individually support the planetary gears; and
    a connector located between the base gear support portions in a circumferential direction of the base flat plate portion, extending in a vertical direction, and connected to the connector receiving portion of the carrier lid.

5. The planetary gear mechanism according to claim 4, wherein
    the carrier includes an upper protruding portion on an upper surface of the carrier and extending upward;
    an upper end portion of the connector protrudes upward from an upper surface of the carrier; and
    a height from an upper surface of the carrier to an upper end of the connector is lower than a height from an upper surface of the carrier to an upper end of the upper protruding portion.

6. The planetary gear mechanism according to claim 1, wherein
    the movable internal gear includes a ceiling located above the carrier;
    the carrier vertically opposes a portion of a lower surface of the ceiling of the movable internal gear; and
    an upper protruding portion protrudes upward toward a lower surface of the ceiling.

7. The planetary gear mechanism according to claim 1, wherein each of the planetary gears include:
    a gear portion in which teeth are juxtaposed on an outer peripheral portion; and
    a rotation shaft arranged along a central axis of the gear portion and protruding in a vertical direction from an upper surface and a lower surface of the gear portion.

8. The planetary gear mechanism according to claim 7, wherein the gear portion and the rotation shaft are made of metal or metal alloy.

9. The planetary gear mechanism according to claim 8, wherein outer surfaces of the planetary gears are fluorine coated.

10. The planetary gear mechanism according to claim 7, wherein
the gear portion is made of resin; and
the rotation shaft is made of metal or metal alloy.

11. The planetary gear mechanism according to claim 10, wherein
the rotation shaft penetrates from an upper surface side to a lower surface side of the gear portion; and
a surface roughness of at least a portion of a contact area of the rotation shaft with the gear portion is larger than a surface roughness of an exposed area of the rotation shaft with respect to the gear portion.

12. The planetary gear mechanism according to claim 1, further comprising:
an upper gear located above the planetary gears and including teeth juxtaposed on an outer peripheral portion;
a lower gear located below the upper gear and including teeth juxtaposed on an outer peripheral portion;
an in-phase portion in which a position of one of the teeth of the upper gear and a position of one of the teeth of the lower gear coincide in a circumferential direction; and
an index portion on an upper surface and a lower surface of the in-phase portion and indicating the in-phase portion.

13. The planetary gear mechanism according to claim 1, wherein a lubricant is applied to each contact area of the sun gear, the fixed internal gear, the planetary gears, the movable internal gear, and the carrier.

14. A geared motor comprising the planetary gear mechanism according to claim 1.

15. A planetary gear mechanism that decelerates rotation input from a motor rotation shaft that rotates about a central axis extending in a vertical direction and outputs the rotation to an outside, the planetary gear mechanism comprising:
a sun gear attached to the motor rotation shaft and rotatable about the central axis;
a fixed internal gear located radially outside the sun gear;
planetary gears that are located radially outside the sun gear and radially inside the fixed internal gear to mesh with the sun gear and the fixed internal gear;
a movable internal gear that is located above the fixed internal gear and radially outside the planetary gears to mesh with the planetary gears, and to rotate about the central axis; and
a carrier that holds upper and lower surfaces of the planetary gears; wherein
a lubricant is applied to each contact area of the sun gear, the fixed internal gear, the planetary gears, the movable internal gear, and the carrier.

16. The planetary gear mechanism according to claim 15, wherein
the carrier individually holds upper surfaces of the planetary gears and lower surfaces of the planetary gears, and includes two carrier holders having a same shape and opposing each other in a vertical direction; and the carrier holder includes:
a flat plate portion that extends in a radial direction while opposing an upper surface or a lower surface of the planetary gears;
a central hole located at a radial center portion of the flat plate portion and penetrating the flat plate portion in a vertical direction; gear support portions that are located on a radially outer side of the central hole on the flat plate portion, are arranged at equal or substantially equal angles in a circumferential direction, and individually support the planetary gears;
a connector located between the gear support portions in a circumferential direction of the flat plate portion and extending in a vertical direction; and
a connector receiving portion which is located between the gear support portions in a circumferential direction of the flat plate portion and to which the connector of another carrier holder opposing each other in a vertical direction is connected.

17. The planetary gear mechanism according to claim 16, wherein
the carrier includes an upper protruding portion on an upper surface of the carrier and extending upward;
an upper end portion of the connector protrudes upward from an upper surface of the carrier; and
a height from an upper surface of the carrier to an upper end of the connector is lower than a height from an upper surface of the carrier to an upper end of the upper protruding portion.

18. The planetary gear mechanism according to claim 15, wherein
the carrier includes a carrier lid that holds one of upper and lower surfaces of the planetary gears, and a carrier base that vertically opposes the carrier lid and holds another one of the upper and lower surfaces of the planetary gears;
the carrier lid includes:
a lid flat plate portion that extends in a radial direction while opposing an upper surface or a lower sur- face of the planetary gears;
a lid central hole located at a radial center portion of the lid flat plate portion and vertically penetrating the lid flat plate portion;
lid gear support portions that are located on a radially outer side of the lid central hole on the lid flat plate portion, arranged at equal or substantially equal angles in a circumferential direction, and individually support the planetary gears; and
a connector receiving portion which is located between the lid gear support portions in a circumferential direction of the lid flat plate portion and to which the carrier base is connected; and the carrier base includes:
a base flat plate portion that extends in a radial direction while opposing an upper surface or a lower surface of the planetary gears;
a base center hole located at a radial center of the base flat plat portion and penetrating the base flat portion in the vertical direction;
base gear support portions located radially outside the base center hole on the base flat plate portion and arranged at equal or substantially equal angles in the circumferential direction to individually support the planetary gears; and
a connector located between the base gear support portions in a circumferential direction of the base flat plate portion, extending in a vertical direction, and connected to the connector receiving portion of the carrier lid.

19. The planetary gear mechanism according to claim 18, wherein
the carrier includes an upper protruding portion on an upper surface of the carrier and extending upward;
an upper end portion of the connector protrudes upward from an upper surface of the carrier; and a height from an upper surface of the carrier to an upper end of the connector is lower than a height from an upper surface of the carrier to an upper end of the upper protruding portion.

20. A planetary gear mechanism that decelerates rotation input from a motor rotation shaft that rotates about a central axis extending in a vertical direction and outputs the rotation to an outside, the planetary gear mechanism comprising:
- a sun gear attached to the motor rotation shaft and rotatable about the central axis;
- a fixed internal gear located radially outside the sun gear;
- planetary gears that are located radially outside the sun gear and radially inside the fixed internal gear to mesh with the sun gear and the fixed internal gear;
- a movable internal gear that is located above the fixed internal gear and radially outside the planetary gears to mesh with the planetary gears, and to rotate about the central axis; and
- a carrier that holds upper and lower surfaces of the planetary gears;
- an upper gear located above the planetary gears and including teeth juxtaposed on an outer peripheral portion;
- a lower gear located below the upper gear and including teeth juxtaposed on an outer peripheral portion;
- an in-phase portion in which a position of one of the teeth of the upper gear and a position of one of the teeth of the lower gear coincide in a circumferential direction; and
- an index portion on an upper surface and a lower surface of the in-phase portion and indicating the in-phase portion.

* * * * *